United States Patent
Bousquet et al.

(10) Patent No.: US 11,388,509 B2
(45) Date of Patent: Jul. 12, 2022

(54) ACOUSTIC REFLECTOR FOR A MICROPHONE CONFIGURED TO MEASURE FLYOVER NOISE GENERATED BY AN AIRCRAFT

(71) Applicant: Airbus Operations (S.A.S.), Toulouse (FR)

(72) Inventors: Philippe Bousquet, Blagnac (FR); Vincent Blandeau, Plaisance du Touch (FR)

(73) Assignee: Airbus Operations (S.A.S.), Toulouse (FR)

( * ) Notice: Subject to any disclaimer, the term of this patent is extended or adjusted under 35 U.S.C. 154(b) by 6 days.

(21) Appl. No.: 17/029,793

(22) Filed: Sep. 23, 2020

(65) Prior Publication Data
US 2021/0092513 A1   Mar. 25, 2021

(30) Foreign Application Priority Data
Sep. 24, 2019 (FR) ...................................... 1910547

(51) Int. Cl.
*H04R 1/34* (2006.01)
*G10L 25/51* (2013.01)
*H04R 1/04* (2006.01)
*H04R 1/08* (2006.01)

(52) U.S. Cl.
CPC .............. *H04R 1/342* (2013.01); *G10L 25/51* (2013.01); *H04R 1/04* (2013.01); *H04R 1/08* (2013.01)

(58) Field of Classification Search
CPC . H04R 1/342; H04R 1/04; H04R 1/08; H04R 1/02; H04R 1/34; H04R 1/32; G10L 25/51
USPC ......... 381/56, 337, 338, 339, 340, 345, 352, 381/160
See application file for complete search history.

(56) References Cited

U.S. PATENT DOCUMENTS

| 4,522,283 | A  |   | 6/1985  | Smith |
| 4,625,828 | A  | * | 12/1986 | Shivashankara ....... G10K 11/20 181/158 |
| 2015/0241267 | A1 | * | 8/2015 | Bousquet ................. H04R 1/08 381/91 |

OTHER PUBLICATIONS

French Search Report for Application No. 1910547 dated Jun. 4, 2020.

* cited by examiner

*Primary Examiner* — Norman Yu
(74) *Attorney, Agent, or Firm* — Jenkins, Wilson, Taylor & Hunt, PA

(57) ABSTRACT

An acoustic reflector for a microphone to measure flyover noise generated by an aircraft. The microphone is configured to measure flyover noise generated by an aircraft flying on a preset path. The acoustic reflector includes at least a central portion having the shape of an ellipse having a major axis and a plurality of peripheral portions distributed around the central portion. The acoustic reflector allows edge effects to be attenuated at the low frequencies of the noise to be measured.

14 Claims, 2 Drawing Sheets

ACOUSTIC REFLECTOR FOR A MICROPHONE CONFIGURED TO MEASURE FLYOVER NOISE GENERATED BY AN AIRCRAFT

CROSS-REFERENCE TO RELATED APPLICATION

This application claims the benefit of and priority to French patent application number 19 10547 filed on Sep. 24, 2019, the entire disclosure of which is incorporated by reference herein.

TECHNICAL FIELD

The disclosure herein relates to the field of the measurement of noise generated by an aircraft. More particularly, it relates to an acoustic reflector for a microphone. The microphone is configured to measure flyover noise generated by an aircraft.

BACKGROUND

Free-field noise generated by an aircraft in flight is generally measured by virtue of microphones installed on acoustic reflectors of flower shape that are placed on the ground, under the path of the aircraft.

For example, document U.S. Pat. No. 4,625,828 discloses an acoustic reflector. The flower shape allows edge effects caused by the difference in acoustic impedance between the reflector and the piece of ground on which the reflector is placed to be attenuated. Under ideal mounting conditions, i.e. on a rigid piece of ground and with a reflector flush with the surface of the ground, this acoustic reflector allows good measurement results to be obtained.

However, in practice the reflector is generally placed on an irregular or absorbent piece of ground and, therefore, edge effects occur and behave as a secondary source. This secondary source has an intensity that varies depending on the mounting conditions of the reflector (impedance of the ground very different from the impedance of the reflector, height of the surface of the reflector relatively to the height of the ground). The effects of this secondary source are maximum when the noise source is located substantially above the reflector.

To attenuate these effects, the reflector described in document U.S. Pat. No. 4,625,828 is generally placed on a bed of sand the surface of which is adjusted so as to fill any difference in height between the surface of the ground and that of the reflector and to ensure a certain impedance match. Experiment shows that the moisture content and the grain size of the sand have an impact on the result.

Under these conditions, the receiver is usable only in the high-frequency range and the medium-frequency range, these ranges corresponding to frequencies above a cut-off frequency of the acoustic frequency, which is substantially equal to 1000 Hz.

In the low-frequency range, i.e. at frequencies below the cut-off frequency, edge effects remain substantial and the measurement of flyover noise may be difficult to exploit because the effects of the secondary source may be great enough to cancel out the signal seen by the microphone (no correction is then possible).

SUMMARY

An object of the disclosure herein is to mitigate this drawback by providing an acoustic reflector that allows satisfactory results to be obtained in the low-, medium- and high-frequency ranges when the source is located substantially above the reflector and even if the conditions of installation (piece of ground, moisture, etc.) are not ideal.

To this end, the disclosure herein relates to an acoustic reflector for a microphone, the microphone being configured to measure flyover noise generated by an aircraft flying on a preset path.

The acoustic reflector comprises at least:
 a central portion comprising a housing configured to receive the microphone;
 a plurality of peripheral portions distributed around the central portion, each of the peripheral portions being joined to the central portion by a near end and extending to a far end.

According to the disclosure herein, the central portion has the shape of an ellipse, the ellipse having a center, a major axis and a minor axis.

Thus, such a reflector shape eliminates cancellation effects and greatly attenuates amplification effects, which may be corrected.

According to a first variant embodiment, the major axis of the ellipse and the preset path of the aircraft are intended to make an angle comprised between 0° and 90° during a measurement of the noise generated by the aircraft.

According to a second variant embodiment, the major axis of the ellipse is intended to be parallel to the preset path of the aircraft during a measurement of the noise generated by the aircraft.

According to a first embodiment, each of the peripheral portions has a constant length between the far end and the near end.

In addition, the plurality of peripheral portions comprises eight peripheral portions.

According to a second embodiment, the plurality of peripheral portions comprises at least a first series of peripheral portions and a second series of peripheral portions, each of the peripheral portions of the first series having a first length between the far end and the near end strictly larger than a second length between the far end and the near end of each of the peripheral portions of the second series.

Moreover, the first length is equal to one third of the semi-major axis of the ellipse of the central portion, the second length being equal to half the first length. According to a first variant, the peripheral portions are distributed so that a peripheral portion of the first series regularly alternates with a peripheral portion of the second series.

According to a second variant, the peripheral portions are distributed so that a first set of peripheral portions is symmetric to a second set of peripheral portions with respect to the major axis of the ellipse, the first set and the second set comprising at least one peripheral portion of the second series between at least two peripheral portions of the first series.

Moreover, the peripheral portions are distributed so that a third set of peripheral portions is symmetric to a fourth set of peripheral portions with respect to the minor axis of the ellipse, the third set and the fourth set comprising at least one peripheral portion of the first series between at least two peripheral portions of the second series.

In addition, the first series comprises four peripheral portions and the second series comprises four peripheral portions.

In addition, each of the peripheral portions has two curved edges that are symmetric with respect to each other, each of the two curved edges having a first end and a second end, the two curved edges meeting at their respective first end, the second end being substantially coincident with a second end of a curved edge of an adjacent peripheral portion.

Furthermore, each of the two curved edges is defined by the following polar equation:

$$R = R_1 + \frac{2}{\pi}(R_2 - R_1)\cos^{-1}\sqrt{1 - \frac{8}{\pi}\theta}$$

in which:
R corresponds to a radius between the center of the ellipse and each of the two curved edges,
$R_1$ corresponds to a distance of the second end with respect to the center of the ellipse,
$R_2$ corresponds to a distance of the first end with respect to the center of the ellipse,
θ corresponds to a variable angle.

The disclosure herein also relates to a method for measuring flyover noise generated by an aircraft flying on a preset path.

According to the disclosure herein, the method comprises the following steps:
a step of positioning an acoustic reflector such as specified above and a microphone accommodated in the housing of the central portion of the acoustic reflector on a piece of ground,
a step of measuring the noise generated by the aircraft when the aircraft flies over the acoustic reflector on the preset path.

BRIEF DESCRIPTION OF THE DRAWINGS

The disclosure herein, with its features and advantages, will become more clearly apparent on reading the description given with reference to the appended drawings, in which:

FIG. 2a shows a view from above of one embodiment of the acoustic reflector. FIG. 2b shows a profile view of the embodiment of the acoustic reflector of FIG. 2a.

DETAILED DESCRIPTION

Figure 1:
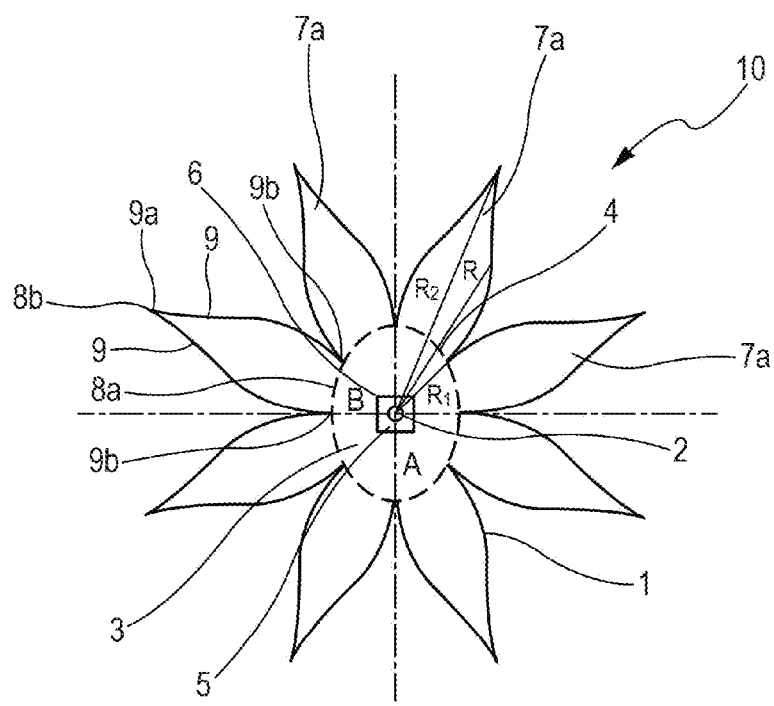
FIG. 1 shows a view from above of the acoustic reflector according to a first embodiment.

One embodiment of the acoustic reflector 1 for a microphone 2 is shown in FIG. 1.

The acoustic reflector 1 comprises at least one central portion 3 having the shape of an ellipse 4. The ellipse 4 of the central portion 3 has a center 5, a major axis A and a minor axis B. The central portion 3 comprises a housing 6 configured to accommodate a microphone 2. The microphone 2 is intended to measure flyover noise generated by an aircraft AC. The aircraft AC is considered to be flying over on a preset path P.

Figures 2A, 2B:
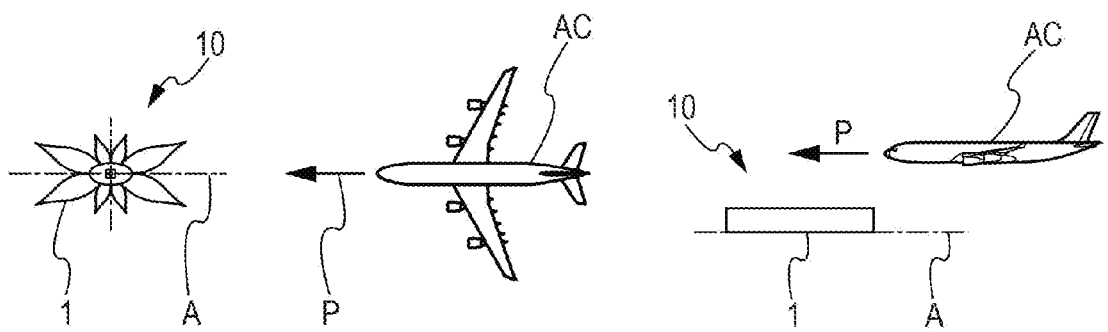

The major axis A of the ellipse 4 is intended to be parallel to the preset path P of the aircraft AC during a measurement of the noise generated by the aircraft AC. FIG. 2 shows an aircraft AC overflying an acoustic reflector 1. In the FIG. 2, the major axis A of the ellipse 4 is preferably placed parallel to the path P of the aircraft AC. It will be noted that, according to one variant embodiment, the major axis A of the reflector may be placed at an angle comprised between 0° and 90° with respect to the path P of the aircraft AC.

The microphone 2 may be housed at the center 5 of the central portion 3. In particular, the microphone 2 may be a "pressure" microphone mounted flush with the surface of the reflector (ground-plane microphone). A ground-plane microphone generally corresponds to a microphone the membrane of which is positioned in the plane of an acoustic surface that reflects substantially all the energy of an incident noise signal. The acoustic surface may thus correspond to the acoustic reflector 1.

The acoustic reflector 1 furthermore comprises a plurality of peripheral portions 7a, 7b, 7c that are distributed around the central portion 3. Each of the peripheral portions 7a, 7b, 7c is joined to the central portion 3 by a near end 8a and extends to a free far end 8b. The acoustic reflector 1 has a flower shape the central portion 3 of which forms the center of the flower and the peripheral portions 7a, 7b, 7c of which form the petals. The near end 8a of the peripheral portions 7a, 7b, 7c corresponds to the claw of the petal, which joins the petal to the center. The near end 8a has a curved shape that follows the outline of the ellipse 4. The far end 8b corresponds to the end of the petal that is furthest from the center.

The acoustic reflector 1 may be made from a metal such as aluminum.

The central portion 3 of the acoustic reflector 1 and the peripheral portions 7a, 7b, 7c form a plate of a constant thickness.

According to a first embodiment (FIG. 1), each of the peripheral portions 7a has a constant length between the far end 8b and the near end 8a.

Non-limitingly, the plurality of peripheral portions 7a comprises eight peripheral portions.

Figure 3:
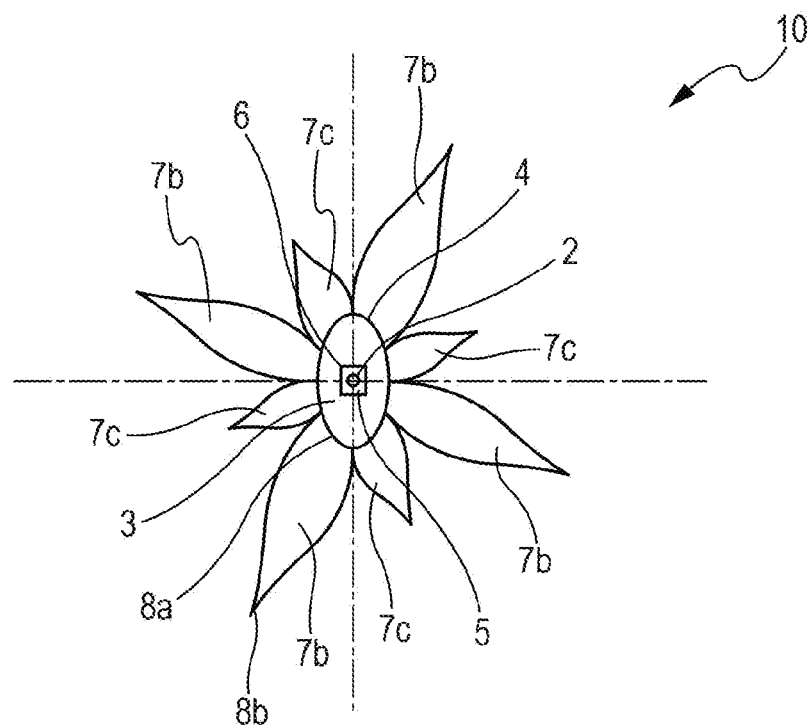
FIG. 3 shows a view from above of a variant of the acoustic reflector according to a second embodiment.
Figure 4:
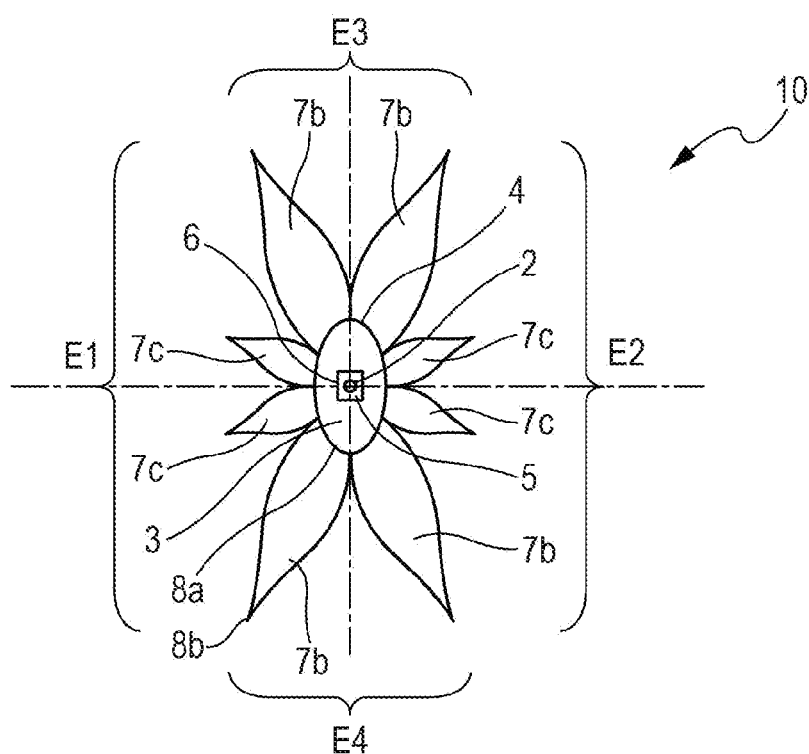
FIG. 4 shows a view from above of another variant of the acoustic reflector according to the second embodiment.

According to a preferred second embodiment (FIGS. 3 and 4), the plurality of peripheral portions 7b, 7c comprises at least a first series of peripheral portions 7b and a second series of peripheral portions 7c. Each of the peripheral portions 7b of the first series has a first length between the far end 8b and the near end 8a. Each of the peripheral portions 7c of the second series has a second length between the far end 8b and the near end 8a. The first length is strictly larger than the second length.

According to a first variant of the second embodiment (FIG. 3), the peripheral portions 7b, 7c are distributed so that a peripheral portion 7b of the first series regularly alternates with a peripheral portion 7c of the second series. The peripheral portions 7b, 7c are therefore arranged asymmetrically.

According to a preferred second variant of the second embodiment (FIG. 4), the peripheral portions 7b, 7c may be distributed so that a first set E1 of peripheral portions is symmetric to a second set E2 of peripheral portions with respect to the major axis A of the ellipse 4. The first set E1 and the second set E2 comprise at least one peripheral portion 7c of the second series between at least two peripheral portions 7b of the first series.

Likewise, the peripheral portions 7b, 7c may be distributed so that a third set E3 of peripheral portions 7b, 7c is symmetric to a fourth set E4 of peripheral portions 7b, 7c with respect to the minor axis B of the ellipse 4. The third set E3 and the fourth set E4 comprise at least one peripheral portion 7b of the first series between at least two peripheral portions 7c of the second series.

By way of illustration, the first series comprises four peripheral portions 7b and the second series comprises four peripheral portions 7c.

In all the embodiments, each of the peripheral portions 7a, 7b, 7c may have two curved edges 9 that are symmetric with respect to each other (FIG. 1). Each of the two curved edges 9 has a first end 9a and a second end 9b. The two curved edges 9 meet at their respective first end 9a. In particular, the first ends 9a of the two curved edges 9 meet at the far end 8a of their peripheral portion 7a, 7b, 7c. The second end 8b is substantially coincident with a second end 8b of a curved edge of an adjacent peripheral portion 7a, 7b, 7c.

Advantageously, each of the two curved edges 9 is defined by the following polar equation:

$$R = R_1(\theta) + \frac{2}{\pi}(R_2 - R_1(\theta))\cos^{-1}\sqrt{1 - \frac{8}{\pi}\theta}$$

in which:
R corresponds to a radius between the center of the ellipse 4 and each of the two curved edges 9,
$R_1$ corresponds to the distance of the second end 9b with respect to the center 5 of the ellipse 4,
$R_2$ corresponds to the distance of the first end 9a with respect to the center 5 of the ellipse 4.

The second end 9b follows the outline of the ellipse 4. The center 5 of the ellipse 4 is coincident with the pole for which the polar equation is defined.

Thus, $R_1(\theta)$ is defined by the following equation:

$$R_1(\theta) = \frac{1}{1 + e\cos\theta},$$

in which:
$p=b^2/a$ with a equal to half the length of the major axis A of the ellipse 4 and b equal to half the length of the minor axis B of the ellipse 4, $$e=\sqrt{a^2-b^2}/a.$$

For each of the curved edges 9, R is computed for an amplitude of angle θ substantially equal to 90° between the straight line joining the center 5 of the ellipse 4 to the second end 9b and the straight line joining the center 5 of the ellipse 4 to the first end 9a.

Non-limitingly, the maximum distance between the center 5 of the ellipse 4 and at least one of the far ends 8b of the peripheral portions 7a, 7b, 7c is substantially equal to 1.25 m.

Non-limitingly, for a given maximum radius Max of the acoustic reflector 1, here set to 1.27 m for practical reasons of transport of the acoustic reflector 1, the length of the peripheral portions 7a, 7b, 7c is preferably maximal. As the central portion 5 cannot have a zero radius (otherwise the reflector would have no mechanical strength), the length H of the peripheral portions 7a, 7b, 7c is defined by dividing the maximum radius Max by 1.15 (H=Max/1.15) and a minimum radius Rc of the acoustic device 1 is defined by multiplying the length H of the peripheral portions 7a, 7b, 7c by the value 0.15 (Rc=H×0.15). Next, the minimum radii determined for each of the peripheral portions 7a, 7b, 7c are replaced by an ellipse with the semi-major axis equal to 0.4 m and the semi-minor axis equal to 0.3 m, giving better results than a circle in the medium- and high-frequency ranges.

Thus, the length of the major axis A of the ellipse 4 is substantially equal to 40 cm and the length of the minor axis B of the ellipse 4 is substantially equal to 30 cm.

Moreover, there is no need to take into account the nature of the piece of ground and the thickness of the acoustic reflector 1. For example, it is not necessary to add sand to the ground, as was necessary with the prior-art acoustic reflector.

The housing 6 of the acoustic reflector 1 allows a microphone 2 to be housed with a view to forming a measurement device 10 allowing a method for measuring flyover noise generated by an aircraft AC flying on a preset path P to be implemented.

The method comprises the following steps:
a step E1 of positioning the acoustic reflector 1 and a microphone 2 accommodated in the housing 6 of the central portion 3 of the acoustic reflector 1 on a piece of ground,
a step E2 of measuring the noise generated by the aircraft AC when the aircraft AC flies over the acoustic reflector 1 on the preset path P.

Preferably, the acoustic reflector 1 is positioned so that the major axis A of the ellipse 4 of the central portion 3 is parallel to the preset path P of the aircraft AC.

According to one variant embodiment, the acoustic reflector 1 is positioned so that the major axis A of the ellipse 4 of the central portion 3 makes an angle comprised between 0° and 90° to the preset path P of the aircraft AC.

While at least one example embodiment of the invention (s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An acoustic reflector for a microphone, the microphone being configured to measure flyover noise generated by an aircraft flying on a preset path, the acoustic reflector comprising at least:
a central portion comprising a housing configured to receive the microphone; and
a plurality of peripheral portions comprising at least a first series of peripheral portions and a second series of peripheral portions, which are distributed around the central portion and are each joined to the central portion by a near end and extend to a far end;
wherein the central portion has a shape of an ellipse, the ellipse having a center, a major axis and a minor axis;
wherein each peripheral portion of the first series of peripheral portions has a first length, as measured from the far end thereof to the near end thereof;
wherein each peripheral portion of the second series of peripheral portions has a second length, as measured from the far end thereof to the near end thereof; and
wherein the first length is larger than the second length.

2. The acoustic reflector according to claim 1, wherein the major axis of the ellipse and the preset path of the aircraft are configured to make an angle of between 0° and 90° during a measurement of the noise generated by the aircraft.

3. The acoustic reflector according to claim 1, wherein the major axis of the ellipse is configured to be parallel to the preset path of the aircraft during a measurement of the noise generated by the aircraft.

4. An acoustic reflector for a microphone, the microphone configured to measure flyover noise generated by an aircraft flying on a preset path, the acoustic reflector comprising at least:
   a central portion comprising a housing configured to receive the microphone; and
   a plurality of peripheral portions distributed around the central portion, each of the peripheral portions being joined to the central portion by a near end and extending to a far end;
   wherein the central portion has a shape of an ellipse, the ellipse having a center, a major axis and a minor axis;
   wherein each of the peripheral portions has two curved edges that are symmetric with respect to each other, each of the two curved edges having a first end and a second end, the two curved edges meeting at their respective first end, the second end being substantially coincident with a second end of a curved edge of an adjacent peripheral portion; and
   wherein each of the two curved edges is defined by a following polar equation of:

$$R = R_1 + \frac{2}{\pi}(R_2 - R_1)\cos^{-1}\sqrt{1 - \frac{8}{\pi}\theta}$$

in which:
   R corresponds to a radius between the center of the ellipse and each of the two curved edges,
   $R_1$ corresponds to a distance of the second end with respect to the center of the ellipse,
   $R_2$ corresponds to a distance of the first end with respect to the center of the ellipse, and
   $\theta$ corresponds to a variable angle.

5. The acoustic reflector according to claim 4, wherein the plurality of peripheral portions comprises eight peripheral portions.

6. The acoustic reflector according to claim 1, wherein the first length is equal to one third of a semi-major axis of the ellipse of the central portion, the second length being equal to half the first length.

7. The acoustic reflector according to claim 1, wherein the peripheral portions are distributed so that a peripheral portion of the first series regularly alternates with a peripheral portion of the second series.

8. The acoustic reflector according to claim 1, wherein the peripheral portions are distributed so that a first set of peripheral portions is symmetric to a second set of peripheral portions with respect to the major axis of the ellipse, the first set and the second set comprising at least one peripheral portion of the second series between at least two peripheral portions of the first series.

9. The acoustic reflector according to claim 8, wherein the peripheral portions are distributed so that a third set of peripheral portions is symmetric to a fourth set of peripheral portions with respect to the minor axis of the ellipse, the third set and the fourth set comprising at least one peripheral portion of the first series between at least two peripheral portions of the second series.

10. The acoustic reflector according to claim 1, wherein the first series comprises four peripheral portions and the second series comprises four peripheral portions.

11. The acoustic reflector according to claim 1, wherein each of the peripheral portions has two curved edges that are symmetric with respect to each other, each of the two curved edges having a first end and a second end, the two curved edges meeting at their respective first end, the second end being substantially coincident with a second end of a curved edge of an adjacent peripheral portion.

12. The acoustic reflector according to claim 11, wherein each of the two curved edges is defined by a following polar equation of:

$$R = R_1 + \frac{2}{\pi}(R_2 - R_1)\cos^{-1}\sqrt{1 - \frac{8}{\pi}\theta}$$

in which:
   R corresponds to a radius between the center of the ellipse and each of the two curved edges,
   $R_1$ corresponds to a distance of the second end with respect to the center of the ellipse,
   $R_2$ corresponds to a distance of the first end with respect to the center of the ellipse, and
   $\theta$ corresponds to a variable angle.

13. A method for measuring flyover noise generated by an aircraft flying on a preset path, comprising:
   providing an acoustic reflector for a microphone, the microphone being configured to measure flyover noise generated by an aircraft flying on a preset path, the acoustic reflector comprising at least:
      a central portion comprising a housing configured to receive the microphone; and
      a plurality of peripheral portions comprising at least a first series of peripheral portions and a second series of peripheral portions, which are distributed around the central portion and are joined to the central portion by a near end and extend to a far end,
      wherein the central portion has a shape of an ellipse, the ellipse having a center, a major axis and a minor axis;
      wherein each peripheral portion of the first series of peripheral portions has a first length, as measured from the far end thereof to the near end thereof;
      wherein each peripheral portion of the second series of peripheral portions has a second length, as measured from the far end thereof to the near end thereof; and
      wherein the first length is larder than the second length;
   positioning the acoustic reflector and a microphone accommodated in the housing of the central portion of the acoustic reflector on a piece of ground; and
   measuring noise generated by the aircraft when the aircraft flies over the acoustic reflector on the preset path.

14. The acoustic reflector according to claim 4, wherein each of the peripheral portions has a constant length between the far end and the near end.

* * * * *